Aug. 18, 1942.  K. R. SJOGREN  2,293,176
COLLET CHUCK CONSTRUCTION
Filed July 26, 1940

INVENTOR
Knut R. Sjogren
BY Robt. D. Pearson
ATTORNEY

Patented Aug. 18, 1942

2,293,176

UNITED STATES PATENT OFFICE 2,293,176

COLLET CHUCK CONSTRUCTION

Knut R. Sjogren, Los Angeles, Calif.

Application July 26, 1940, Serial No. 347,719

4 Claims. (Cl. 279—53)

This invention relates to an improved collet chuck.

Among the objects of the invention are: To lessen the time required for applying the chuck to the objects which it is to support and rotate; to provide for extreme accuracy of adjustment within the chuck of the object to be rotated by it; and to provide for gripping and releasing the work in a more rapid and more efficient manner and with a minimum of manual effect on the part of the workman.

More specific objects of the invention relate to the provision of a chuck construction which is better adapted to cooperate with standard types of collets now in use; and to provide a superior hand wheel structure for the chuck.

This collet chuck is adaptable not only to lathes, but also to other machines, such as milling machines, turret lathes, grinders and special production machines.

Other objects, advantages, and features of invention will hereinafter appear.

Referring to the accompanying drawing, which illustrates what is at present deemed to be a preferred embodiment of the invention, Fig. 1 is a view illustrating the complete structure of the chuck partly in side elevation and partly in vertical section, the plane of the sectioned portion of the view being indicated by the line 1—1 on Fig. 2.

Figure 1:
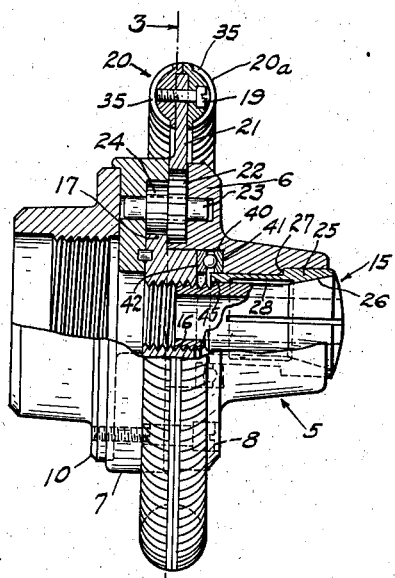
Figure 2:
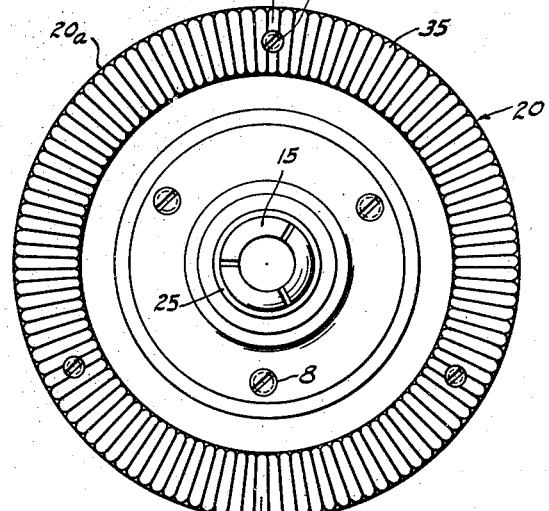
Fig. 2 is an elevation looking at the outer end of the chuck.
Figure 3:
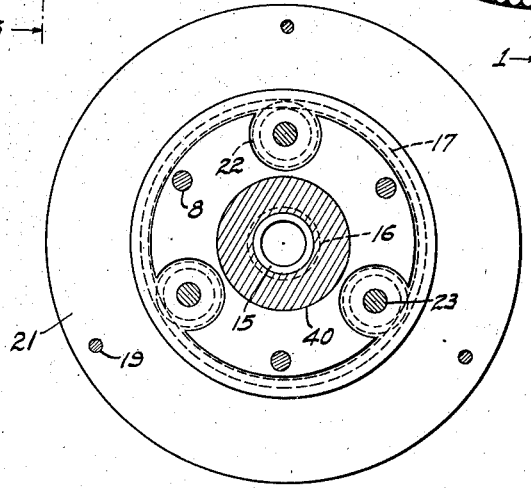
Fig. 3 is a sectional detail on line 3—3 of Fig. 1, parts being removed.
Figure 4:
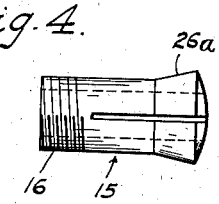
Fig. 4 is a side elevation of a collet sleeve of the type suited for use in the chuck.

Referring in detail to the drawing, the present chuck construction, like that shown in my Patent No. 1,789,601, issued January 20, 1931, has the tapered chuck head 5 provided around the base of its taper with an external flange or shoulder 6, the flanged end of said head being attached to an annular back plate 7 by suitable means, for example screws 8, one of which is indicated by dotted lines in Fig. 1, said screws extending into the member 10 whereby the chuck is mountable upon a lathe spindle.

The invention resides, to a considerable extent, in the combination of the resilient collet sleeve 15 with the adjacent portion of the chuck means upon which it is mountable; but not, per se, in the collet shown, which is well known and can be obtained in various sizes. The engagement of the screw threaded portion 16 of the mounted collet with the internally screw threaded central annular gear 17 is not relied upon to center truly the collet, but a machined and accurately ground annular bearing surface is provided within the inner part of an adapter sleeve 25 which is inserted within the chuck head 5, and the inner portion of the collet closely but slidably fits within this bearing surface. In order to slide said collet sleeve within said bearing surface the aforesaid internally threaded annular gear 17 is indirectly rotated from the hand wheel 20, the web 21 of which is internally toothed to act upon a plurality of gear wheels 22, one of which is shown in the drawing. Said gear wheels 22 are fixed to shafts 23 to which are fixed gears 24 to rotate the central annular gear 17.

Describing more in detail the adapter sleeve 25, said sleeve is diametrically enlarged around its internal bevel 26, thus providing around it an annular shoulder 27 which is directed away from the front end of the chuck and which abuts against a like internal shoulder provided within the chuck head, thereby forming a definite, accurate stop means for said sleeve, the bore of the chuck being shaped to conform to the external contour of the adapter sleeve. Said adapter sleeve has its internal diameter enlarged thus providing an annular clearance 28 between it and the inserted collet sleeve 15. The adapter sleeve 25 may be made an integral part of the chuck head without departing from the spirit of the invention, broadly claimed.

The split collet sleeve operates to grip the work, according to a well known principle, by reason of the coaction between the externally beveled portion 26 of part 15 and the internally beveled part 26a of the adapter sleeve 25.

Said adapter sleeve 25 is made of hardened metal.

The rim portion of the hand wheel 20 is furnished with a multiplicity of anti-slip beads 35 which radiate from the center of the wheel to expedite its manufacture. Said beads 35 are identically shaped and are equally spaced, thereby affording good gripping power of hand wheel. This enables the operator to operate the chuck efficiently and to control well the sliding movements of the collet.

The rim portion 20a of the hand wheel is split radially into identical halves which are bolted together by bolts 19 or otherwise secured to opposite sides of the peripheral portion of the wheel web 21, as shown in the drawing, thereby simplifying replacement of new parts in case of accidental damaging of the hand wheel.

A thrust bearing assembly 40 of the ball type is interposed between the inwardly directed annular wall of shoulder 41 of the chuck head 5 and the outwardly directed annular shoulder 42 of the annular gear 17. This bearing assembly reduces the amount of friction that would otherwise be encountered when turning the hand wheel to adjust the collet. Said bearing assembly is seated within an annular recess formed concentrically upon the inner face of the head 5 and bounded internally by an annular flange 45 formed by the inner end of the adapter sleeve 25, and forwardly bounded by the aforementioned annular wall 41 of said head. The width of said flange 45 is only about one-half that of the depth of said recess. Said flange 45 is intended for a guide for the inner side of the bearing assembly and therefore does not need to project farther than the width of said assembly. However, if desired, said flange 45 may be made to extend across the entire width of the bearing assembly, thereby additionally protecting it from foreign matter. Said part 45 has an accurately ground, circular, inner bearing surface for centering the collet 16. The adapter sleeve 25, when regarded as a part of the chuck assembly into the bore of which the collet sleeve 15 is inserted, separates a part of said bore from a recess therearound, by means of the annular lip formed by the thickened or internally flanged portion 45 at the inner end of the inserted collet sleeve.

I claim:

1. In a collet chuck, the combination, with a collet having a cylindrical shank portion; of a chuck assembly containing an adapter sleeve having a bore a portion of which has a truly ground internal cylindrical surface within which said collet shank portion is closely fitted in a slidable manner, an annular gear within said chuck assembly having a screw threaded connection with said collet to slide it within said bearing, means to rotate said gear in relation to said chuck assembly, said assembly including a chuck head through which said bore extends and said head having a concentric annular recess in its inner face, a portion of said recess being separated from said bore by a concentric annular lip formed by the inner part of said adapter sleeve, and a bearing assembly comprising a pair of rings in an adjacent axial relation to each other with balls interposed between their inner faces, said rings being positioned concentrically in relation to the axis of said bore, one of them having its outer face abutting laterally against one face of said concentric annular gear, the other of said rings having its outer face abutting against the front side of said annular recess in a surrounding relation to said lip, whereby said rings in conjunction with the balls between them form a thrust bearing structure to reduce friction between said annular gear and the front side of said annular recess.

2. The subject matter of claim 1 and, the aforesaid truly ground bore portion of said adapter sleeve occupying the inner surface of said annular lip, said bore having, nearer the outer end of the chuck assembly, a diametrical enlargement affording an annular clearance between it and that portion of the collet which it surrounds.

3. The combination, with a chuck head having an axial bore the outer portion of which is diametrically larger than its inner portion, thus providing within said bore a forwardly directed annular shoulder; of an adapter sleeve contoured externally to fit closely within said bore, said sleeve having an external annular shoulder in an abutting relation to said shoulder of said bore and said chuck head having an internal diametrical enlargement to which the inner end of said bore extends, said adapter sleeve projecting inwardly beyond said bore and into said enlargement, thereby providing an annular space between the internally projecting portion of said sleeve and the surrounding portion of the chuck head, a central gear located axially within the chuck head, the outer face of said gear forming the inner side of said annular space, a ball bearing structure comprising a pair of rings in an adjacent axial relation to each other with balls interposed between their inner faces, said rings being positioned concentrically in relation to the axis of said bore, one of them having its outer face abutting laterally against one face of said concentric annular gear, the outer of said rings having its outer face abutting against the front side of said annular recess, said bearing structure functioning to reduce friction between said surface and said gear, a collet sleeve mounted within said adapter sleeve, said collet sleeve having a screw threaded relation to the interior portion of said annular gear to be retracted and extended thereby, and means to rotate said annular gear in relation to the chuck head, there being cooperating bevels between the outer portions of said adapter sleeve and said collet sleeve, whereby the retraction of the latter sleeve causes it to grip the work.

4. The subject matter of claim 3 and, the inner end portion of said adapter sleeve having internally a truly ground machined surface to center said collet sleeve, and said adapter sleeve being internally enlarged thereby forming an annular clearance between the two sleeves extending from said ground surface to the beveled portions of the two sleeves.

KNUT R. SJOGREN.